UNITED STATES PATENT OFFICE

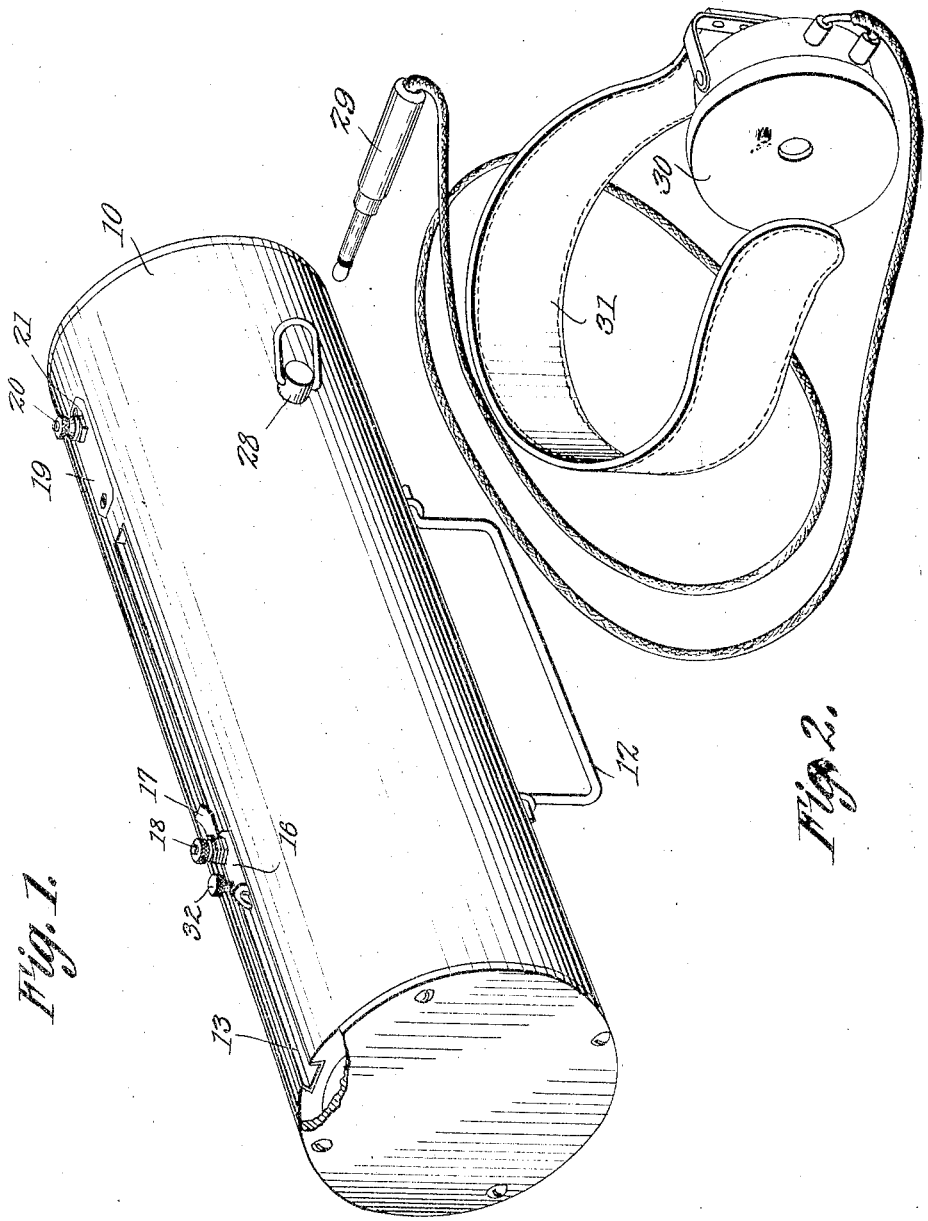

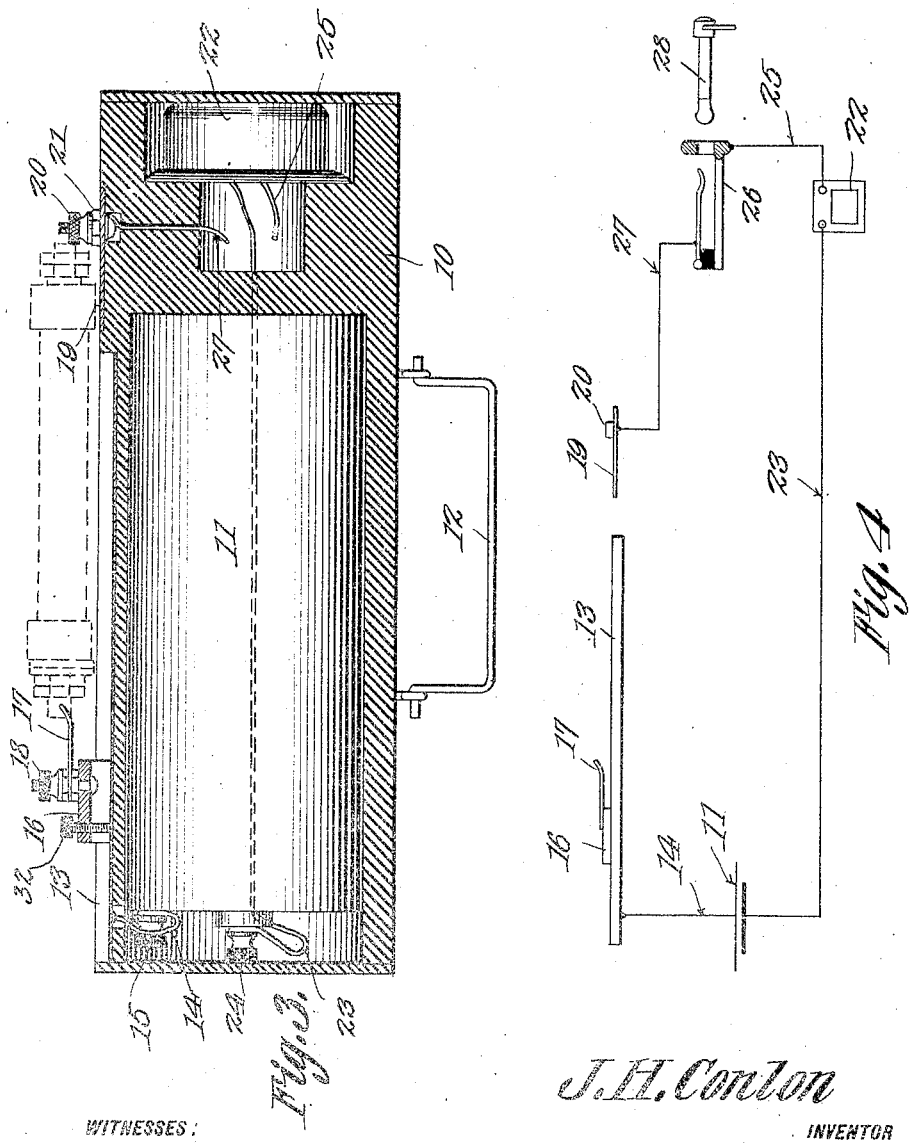

JAMES H. CONLON, OF UNION, OREGON.

ELECTRIC TESTING APPARATUS.

1,100,225.

Specification of Letters Patent. Patented June 16, 1914.

Application filed May 14, 1913. Serial No. 767,598.

*To all whom it may concern:*

Be it known that I, JAMES H. CONLON, a citizen of the United States, residing at Union, in the county of Union and State of Oregon, have invented certain new and useful Improvements in Electric Testing Apparatus, of which the following is a specification.

This invention relates to apparatus for testing for faults in electric circuits, and its object is to provide a simple and portable apparatus of this kind which can be used for testing fuses, incandescent lamps, and wiring installations for revealing open circuits in the field coils of generators or motors; and for numerous other purposes as will readily suggest themselves to those skilled in the art.

The invention consists in a novel combination and arrangement of parts to be hereinafter described and claimed, reference being had to the accompanying drawings in which—

Figure 1 is a perspective view of the apparatus. Fig. 2 is a similar view of a receiver used in connection with the apparatus. Fig. 3 is a central longitudinal sectional view of the apparatus. Fig. 4 is a diagrammatic view showing the circuits.

Referring specifically to the drawings, 10 denotes a portable casing in which is mounted an ordinary dry battery 11 for furnishing the current used in the operation of the apparatus. The case is cylindrical in form and may be made of wood, fiber or other insulating material, and it is of such a size that it can be conveniently carried, a handle 12 for this purpose being provided.

In the outer surface of the casing is a longitudinal groove in which is rigidly mounted a channeled metal strip 13 connected by wire 14 to one of the battery terminals 15. In the channel of the strip 13 is mounted a slide 16 carrying a contact spring 17 and a binding screw 18. Adjacent to one end of the strip 13, and spaced therefrom, a metal contact plate 19 is embedded in the casing 10, said plate carrying a binding post 20 provided with a lock nut 21.

In one end of the casing 10 is mounted a buzzer or similar electrical audible signal device 22 having one of its terminals connected by a wire 23 to the second battery terminal 24. The other terminal of the buzzer is connected by a wire 25 to a spring-jack switch 26 mounted in the casing and connected by a wire 27 to the contact plate 19. A plug 28 insertible from the outside of a casing controls this switch. This plug is removable so that there may be inserted a plug 29 carrying a receiver 30 provided with a suitable head gear 31. Thus the receiver may be introduced into the battery circuit for a purpose to be hereinafter described.

The apparatus is used as follows: For testing fuses, the plug 28 is inserted, and the sliding contact 17 is adjusted to correspond to the length of the fuse. The lineman can now quickly test all the fuses on a heavily laden junction pole by simply bringing the contacts 17 and 19 against the terminals of each fuse in succession. If the fuse is good, the battery circuit is closed thereby and the buzzer 22 will be sounded. If the fuse is broken or burned out, no sound will be heard, so that the lineman will at once know that a new fuse is required. The slide 16 enables adjustment to be made to adapt the apparatus to any size or style of fuse.

The apparatus can also be used in testing for open circuits in the field coils of generators or motors, and primary or secondary coils of transformers, or in testing for grounds between the coil and the generator frame, or coil and transformer case, by touching the contacts 17 and 19 to the coil and the iron case or frame, respectively. In case the distance is too great to be reached by the contacts, wires can be fastened to the contacts by means of the screw 18 and the binding post 20, and extend out any desired length in order to make the connection.

For testing incandescent lamps, the plug 28 is withdrawn and the receiver 30 is placed in the battery circuit by inserting the plug 29. The lamp is placed perpendicular, with the tip of the lamp base resting on the contact 19, and the contact 17 engaging the outside of the lamp base, the slide 16 being adjusted so that a proper contact is made. If the lamp is in good order, a click will instantly be heard in the receiver 30, but if the filament is broken or burned out, no sound will be heard.

Induction coils that have too much resistance to sound the buzzer 22 may also be tested with the receiver, and no matter how large the coil, or how many turns of very fine wire are wrapped on it, a click will instantly be heard in the receiver 30 when the terminals are touched, but if the coil should be burned out, or be broken some place in the winding, then no sound will be heard, and the operator knows at once that the coil needs rewinding, or that a new one must be substituted. Both primary and secondary windings can be tested in this way.

The apparatus can be used to a good advantage in testing for grounds between telephone pairs and the lead sheath inclosing the same, by touching one contact to the pair in trouble and the other contact to the lead cable. If a ground exists, then a sound will instantly be heard in the receiver.

The apparatus may also be used for testing out wiring installations, annunciator circuits, and for testing for grounds between wires and the conduit system after the wires are drawn into the conduit. It is also useful for testing for broken wires or grounds between the magnets and engine frame of automobiles, and can be made useful around any shop having electric apparatus to be tested. The slide 16 carries a set screw 32 for locking the same in adjusted position.

I claim:

1. An electric testing apparatus comprising a casing having on the outside a contact and a metallic groove separated from the contact, a battery carried by the casing, said battery having one of its terminals connected to the groove, an electrically operated signal device connected to the other battery terminal and to the aforesaid contact, a slide mounted in the aforesaid groove, and a contact carried by the slide.

2. An electric testing apparatus comprising a casing having on the outside a contact and a metallic groove separated from the contact, a battery carried by the casing, said battery having one of its terminals connected to the groove, an electrically operated signal device connected to the other battery terminal and to the aforesaid contact, a slide mounted in the aforesaid groove, a contact carried by the slide, and wire attaching means carried by the first-mentioned contact and by the slide.

3. An electric testing apparatus comprising a casing having on the outside a contact and a metallic groove separated from the contact, a battery carried by the casing, said battery having one of its terminals connected to the groove, an electrically operated signal device connected to the other battery terminal and to the aforesaid contact, a slide mounted in the aforesaid groove, a contact carried by the slide, and means for introducing an auxiliary circuit into the battery circuit, and an electrically operated signal device in the auxiliary circuit.

In testimony whereof I affix my signature in presence of two witnesses.

JAMES H. CONLON.

Witnesses:
W. T. WRIGHT,
C. W. WRIGHT.